(12) United States Patent
Risen

(10) Patent No.: US 8,910,732 B1
(45) Date of Patent: Dec. 16, 2014

(54) AXLE ARRANGEMENT FOR MOBILE CRANE AND RELATED METHODS

(75) Inventor: Wiley T. Risen, Nicholasville, KY (US)

(73) Assignee: Link-Belt Construction Equipment Co., L.P., LLLP, Lexington, KY (US)

( * ) Notice: Subject to any disclaimer, the term of this patent is extended or adjusted under 35 U.S.C. 154(b) by 488 days.

(21) Appl. No.: 13/182,053

(22) Filed: Jul. 13, 2011

(51) Int. Cl.
*B62D 55/08* (2006.01)

(52) U.S. Cl.
CPC ..................................... *B62D 55/08* (2013.01)
USPC ........................................................ 180/9.48

(58) Field of Classification Search
CPC .................................................... B62D 55/084
USPC ..................... 180/9.48, 5.22; 301/124.1, 128
See application file for complete search history.

(56) References Cited

U.S. PATENT DOCUMENTS

| | | | |
|---|---|---|---|
| 1,875,052 A | 8/1932 | Ljungkull | |
| 2,681,231 A | 6/1954 | Kondracki | |
| 3,036,650 A | 5/1962 | Cimino | |
| 3,037,571 A * | 6/1962 | Zelle | 180/9.48 |
| 3,313,368 A | 4/1967 | Carter et al. | |
| 3,757,881 A | 9/1973 | Short et al. | |
| 3,820,616 A | 6/1974 | Juergens | |
| 3,894,598 A | 7/1975 | Yeou | |
| 4,000,784 A | 1/1977 | Morrow, Sr. et al. | |
| 4,341,276 A | 7/1982 | Furuichi | |
| 4,386,673 A | 6/1983 | Carter et al. | |
| 4,431,074 A | 2/1984 | Langerud | |
| 5,121,808 A * | 6/1992 | Visentini et al. | 180/435 |
| 5,823,279 A | 10/1998 | Petzold | |
| 6,145,610 A * | 11/2000 | Gallignani | 180/9.48 |
| 6,206,125 B1 | 3/2001 | Weddle | |
| 6,406,043 B1 | 6/2002 | Balmer | |
| 7,163,227 B1 | 1/2007 | Burns | |
| 7,373,999 B2 * | 5/2008 | Haringer | 180/9.48 |

* cited by examiner

*Primary Examiner* — Joseph Rocca
*Assistant Examiner* — Felicia L Brittman
(74) *Attorney, Agent, or Firm* — King & Schickli, PLLC

(57) ABSTRACT

A mobile crane includes a main body and extendable axles, which are selectively re-positioned relative to the main body through strategically positioned apertures. The axles may be automatically locked to the main body in a desired one of the multiple positions without operator intervention. The axles one or more tapered ends for connecting to side frames, which may support crawler tracks. The tapered ends of the axles extend through openings located in the frames such that they are removably connected to an outside or exterior portion of the frames relative to the main body.

20 Claims, 13 Drawing Sheets

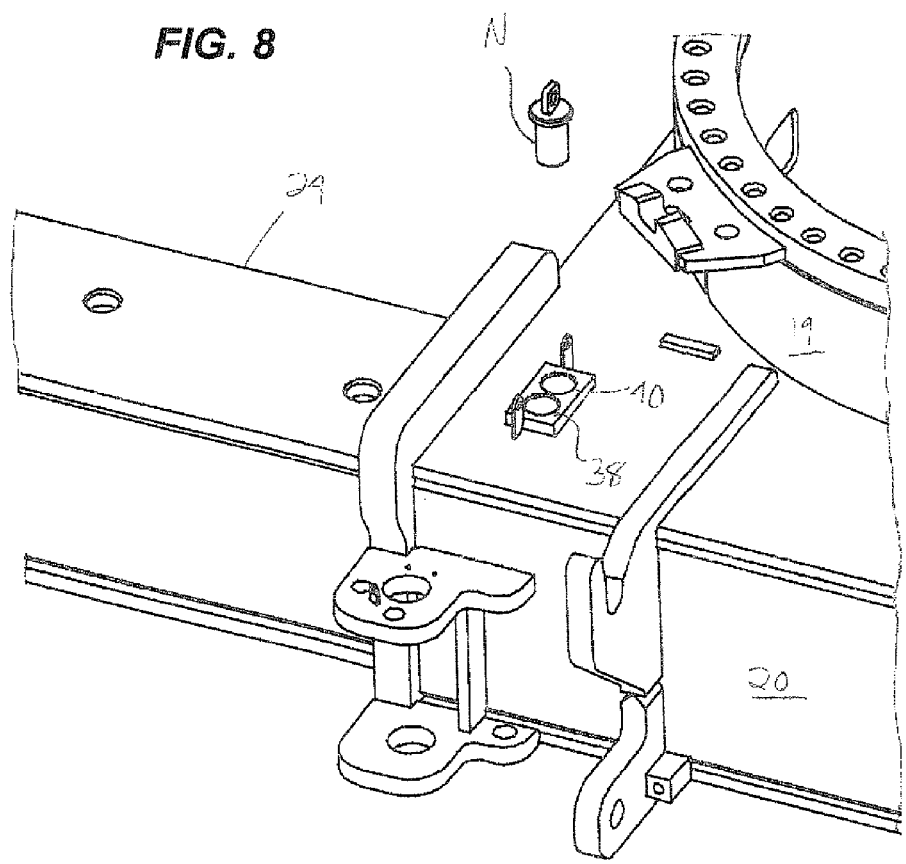

AXLE ARRANGEMENT FOR MOBILE CRANE AND RELATED METHODS

TECHNICAL FIELD

This disclosure relates generally to the vehicle art, and more particularly to an axle arrangement for a mobile crane.

BACKGROUND OF THE INVENTION

Cranes or similar lifting devices are well known and are typically used to lift, lower and move horizontally a variety of materials. Cranes are used in a number of applications, such as in the transport industry for loading and unloading freight, the construction industry for movement of various materials and the manufacturing industry for the assembling of heavy materials. One particular type of crane is a mobile crawler crane, which is a crane mounted on an undercarriage with a set of crawler tracks that provide mobility on uneven ground and improved traction.

In the usual arrangement, the crawler tracks comprise a plurality of links formed together in an endless chain-type fashion with pads formed on the links for engagement with the ground. The multiple pads along the lower run of the endless track in engagement with the ground at any one time provide exceptional traction, while the upper run serves to return the track. Driven sprockets engage the inner surfaces of the links to drive the track along an endless path and thereby provide movement to the vehicle.

While crawler tracks are quite useful when the crane is moving about the job site in a traveling mode, they are not well-suited for use in over-the-road or highway travel from one job site to another. Generally, the crane is normally transported on a tractor trailer from one site to the next. In many cases, over-the-road transport requires removing the entire assembly supporting and driving the crawler tracks from the vehicle to reduce the size and load in order to comply with governmental regulations on maximum vehicle width and possibly placing them on a different tractor trailer altogether to comply with maximum weight restrictions.

Since this operation is costly in terms of efficiency, a significant sought after advantage is of course the ability to complete it quickly such that the construction company can make the most efficient use of their capital equipment. In the past, this and other quick assembly type of features have been a particular focus for design of many types of heavy duty crawler cranes Nevertheless, this is typically a difficult process as most axles and side frames are connected with cap screws, which makes it difficult to assemble and disassemble the axles and side frames due to fit interface between the parts. Once assembled together, there are a number of parts required to hold them together, which makes the assembly and disassembly process time-consuming.

Accordingly, a need is identified for addressing and overcoming the foregoing limitations. Specifically, it would be desirable to form a removable connection between the axles and the frames that allows the frames to be easily removed for transport and easily reassembled once the transport is complete. The connection should allow the axles and the frames to easily mate together with a minimum number of parts and minimal effort from the operator. Furthermore, the configuration should perform well in different environments and as the crane ages and wears. Finally, the axles should be laterally adjustable in an efficient manner with minimal operator intervention.

SUMMARY OF THE INVENTION

An apparatus is provided for a mobile crane supported by ground-engaging motive devices for moving the crane in a travel direction. The apparatus comprises an axle elongated in a direction transverse to the travel direction and adapted to be connected to the crane. The axle includes a first end including a first aperture. A first frame supporting one of the ground-engaging motive devices includes a first opening through which the end of the axle is exposed adjacent an external side of the frame. The frame includes a second aperture for aligning and registering with the first aperture in a vertical direction so as to be capable of receiving a fastener, such as a pin, in the vertical direction for connecting the first end of the axle to the frame.

In one embodiment, the first end of the axle is tapered, and preferably to a vertical dimension that is substantially less than the size of the opening in the side frame. The axle may include a second tapered end for positioning in association with a second frame for supporting another of the ground engaging motive devices. The second frame includes a second opening for receiving the second tapered end of the second portion of the axle.

The axle may include a first portion telescopingly received in a second portion, the first portion including the first end. An actuator may be provided for moving the first portion relative to the second portion. The axle may optionally include first and second receivers, and a main body of the crane may further include a third receiver adapted for receiving a connector for engaging one of the first and second receivers.

The first and second receivers may comprise laterally spaced apertures formed in a top wall of the axle. Preferably, the first and second receivers comprise longitudinally spaced apertures formed in a top wall of the axle. Most preferably, the first and second receivers are laterally and longitudinally spaced, and the third receiver includes a first hole for aligning with the first receiver and a second hole for aligning with the second receiver.

A first end of the axle may include a pair of vertically spaced plates, one of said plates including the first aperture. The frame may in turn include a pair of spaced plates for receiving the tapered end of the axle, one of said plates including the second aperture. A connector, such as a pin, may be provided for passing through the vertically aligned apertures to form a connection between the axle and the side frame.

Another aspect of the disclosure relates to an apparatus for a mobile crane having a main body for connecting with spaced side frames, each for supporting a ground-engaging motive device for moving the crane in a travel direction. The apparatus comprises an axle adapted to be connected to the main body at one end and to the frame at the other in a manner that allows the axle to be extended and retracted in a direction transverse to the travel direction. The axle includes a wall having first and second receivers spaced from each other in the travel direction. The first receiver is adapted for receiving a connector for defining an extended position of the axle relative to the main body and the second receiver is adapted for receiving the connector for defining a retracted position of the axle relative to the main body.

In one embodiment, a third receiver is carried by the main body, said third receiver adapted for receiving the connector in the extended position or the retracted position of the axle. Preferably, the first receiver comprises a first aperture, the second receiver comprises a second aperture, and the third receiver comprises a third aperture aligned with the first aperture in the transverse direction and a fourth aperture aligned with the second aperture in the longitudinal direction. The axle may also include a fourth receiver aligned with one of the first and second receivers, the fourth receiver defining an intermediate position of the axle between the extended position and the retracted position.

Preferably, the axle includes a first tapered end adapted for passing through an opening one of the frames. Most preferably, the axle includes a second tapered end adapted for passing through an opening in another of the frames. Any of the foregoing embodiments may form part of a mobile crane, which may further comprise a main body carrying a bearing, a superstructure supporting by the bearing, and a boom carried by the superstructure.

A further aspect of this disclosure pertains to a method of connecting a ground-engaging motive device to a main body of a crane. The method comprises: connecting an axle to the main body, the axle having a first end including a first aperture; positioning the first end of the axle within an opening in a frame supporting the ground-engaging motive device; and passing a vertically extending connector or pin through the first end of the axle and through a portion of the frame adjacent an external side of the frame.

Yet another aspect of the disclosure is a method of selectively re-positioning a ground-engaging motive device relative to a main body of a crane. The method comprises connecting an axle to the main body in a first position by placing a connector, such as a pin, in a first receiver associated with the main body, said first receiver aligned with a second receiver associated with the axle; and moving the axle to a second position by placing the pin in a second receiver associated with the main body, said second receiver aligned with a third receiver associated with the axle. The method may further include the step of moving the axle to a third position by placing the connector or pin in the first or second receiver so as to align with a fourth receiver associated with the axle.

Still other objects and advantages will become apparent to those skilled in the art from the following description wherein there is shown and described a preferred embodiment of this invention, simply by way of illustration of one of the modes best suited to carry out the invention. As it will be realized, the disclosed concepts are capable of other different embodiments and the several details are capable of modification in various aspects, all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification illustrate several aspects of the present invention and, together with the description, serve to explain the principles of the disclosed embodiments of the invention.

In the drawings:

FIG. 8 is a partially cutaway perspective view of the frame and axle;

DETAILED DESCRIPTION OF THE PREFERRED EMBODIMENT

Figure 1:
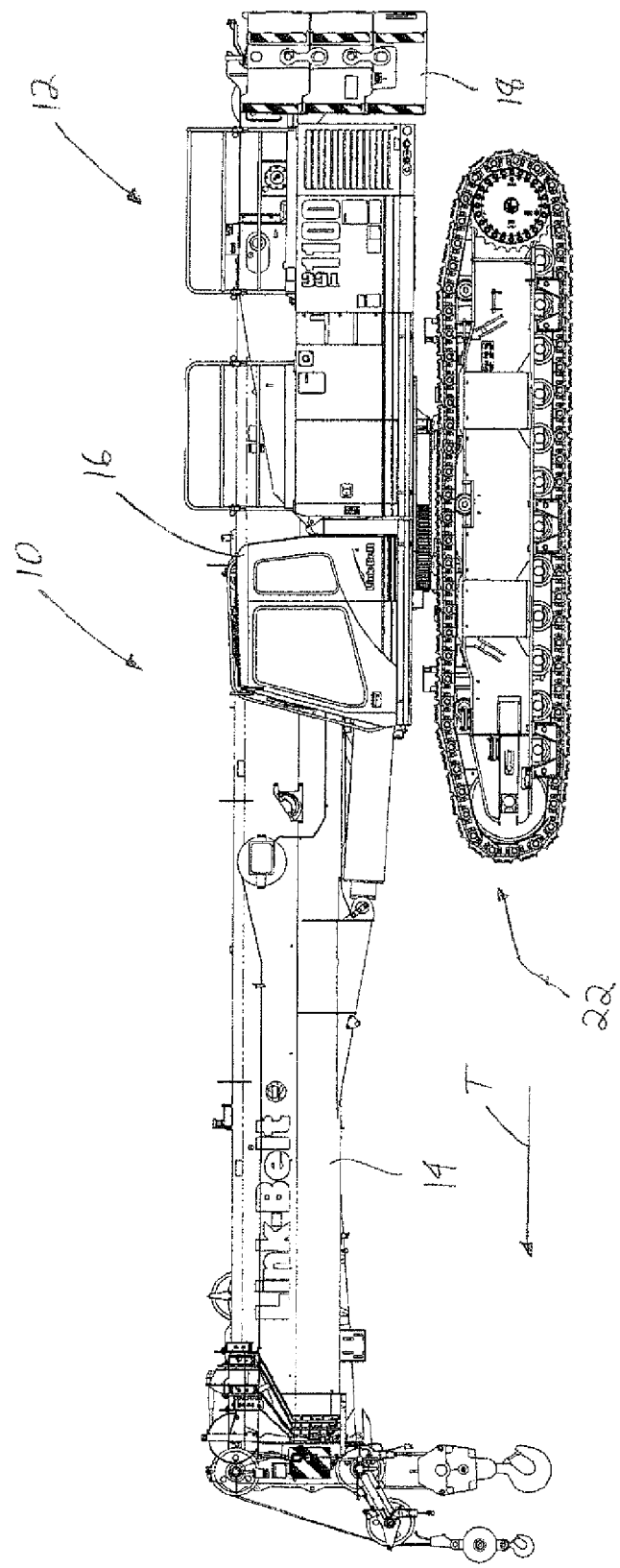
FIG. 1 is a side view of an exemplary vehicle, such as a crane, to which aspects of the present disclosure may be applied.

Reference is now made to FIG. 1, which provides an overall side view of a representative vehicle, such as a crane 10, for which the various embodiments of the various inventions described herein may have utility. As will be recognized, the crane 10 is generally shown as being assembled and includes a superstructure 12 carrying a boom 14, which may comprise a plurality of telescoping portions. An operator's cab 16 is also typically provided, which includes the controls for controlling the operation of the crane 10, as are removable counterweights 18 for assisting in balancing any load being lifted.

Figure 2:
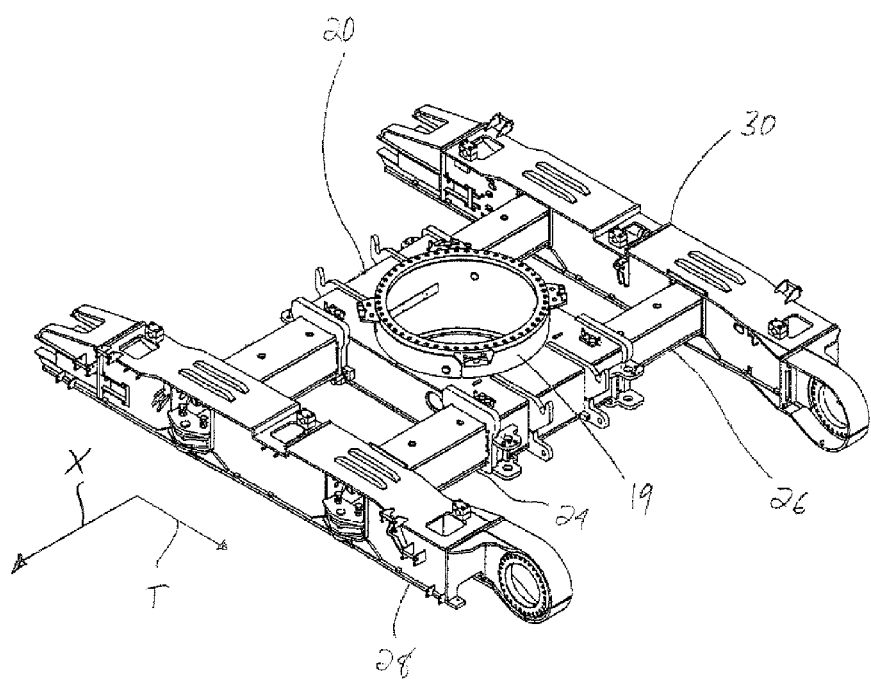
FIG. 2 is a perspective top view of a main body of a crane with axles and side frames connected thereto.
Figure 12:
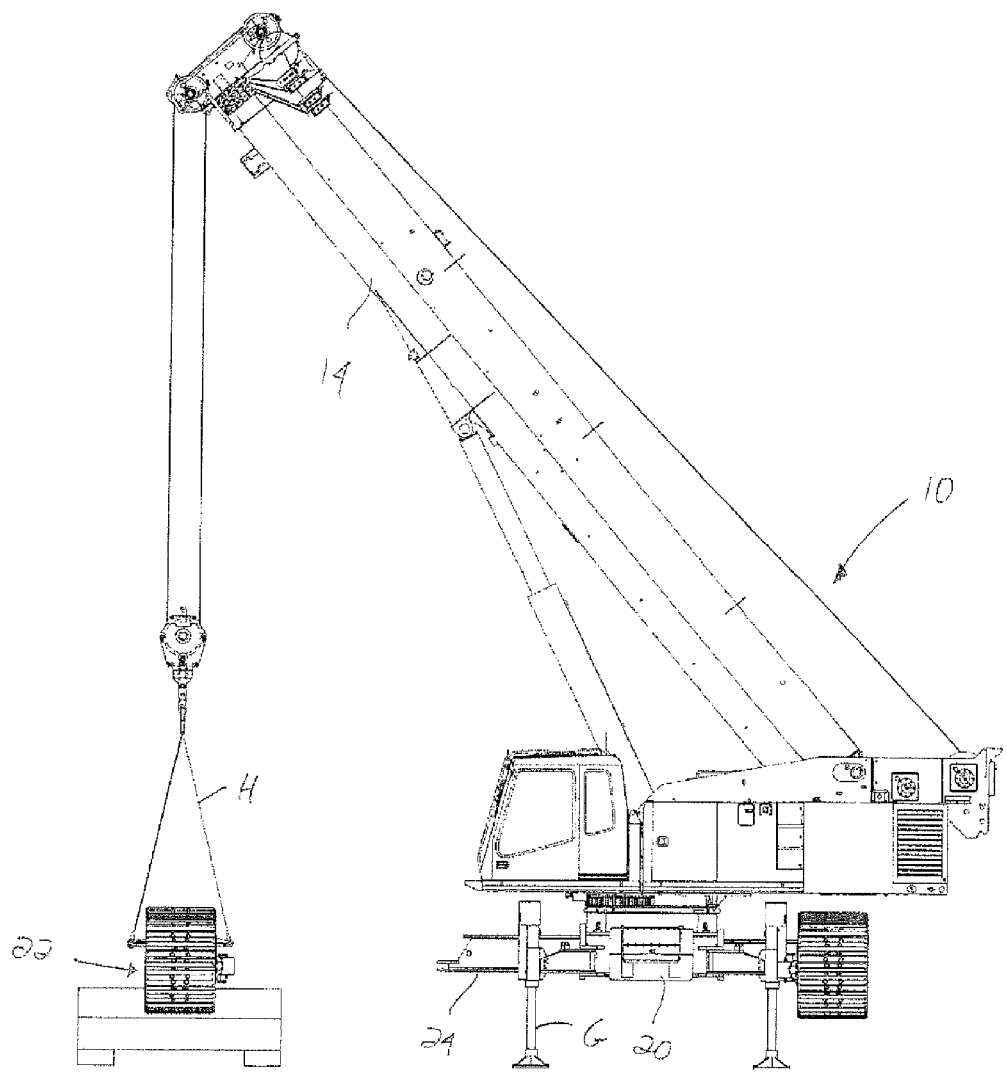
FIG. 12 illustrates a possible mode of use of the crane including the axles according to the disclosure.

With combined reference to FIG. 2, the superstructure 12 is supported on an annular bearing 19 carried by a main frame or body 20, which is sometimes called a chassis or carbody. To provide mobility to the crane 10, this main body 20 is supported above the ground by motive devices, such as crawler tracks 22. Outriggers G (see FIG. 12) or the like may also be provided for raising the crawler tracks 22 above the ground for purposes of stability or removal. The details of the overall construction of such a crane 10 and the boom 14 are generally known in the art and, therefore, are not repeated herein.

Turning to FIG. 2, the main body 20 is adapted to connect to at least one axle, and preferably a pair of extendable axles 24, 26. The axles 24, 26 in turn engage the side frames 28, 30 for supporting the ground-engaging motive devices, such as crawler tracks 22. In the illustrated embodiment, the axles 24, 26 are substantially parallel to each other and run substantially perpendicular to the direction of travel T of the crane 10, or in the transverse direction X. These axles 24, 26 are connected at their opposing ends to the side frames 28, 30, which are substantially parallel to one another and to the direction of travel T.

Figure 3:
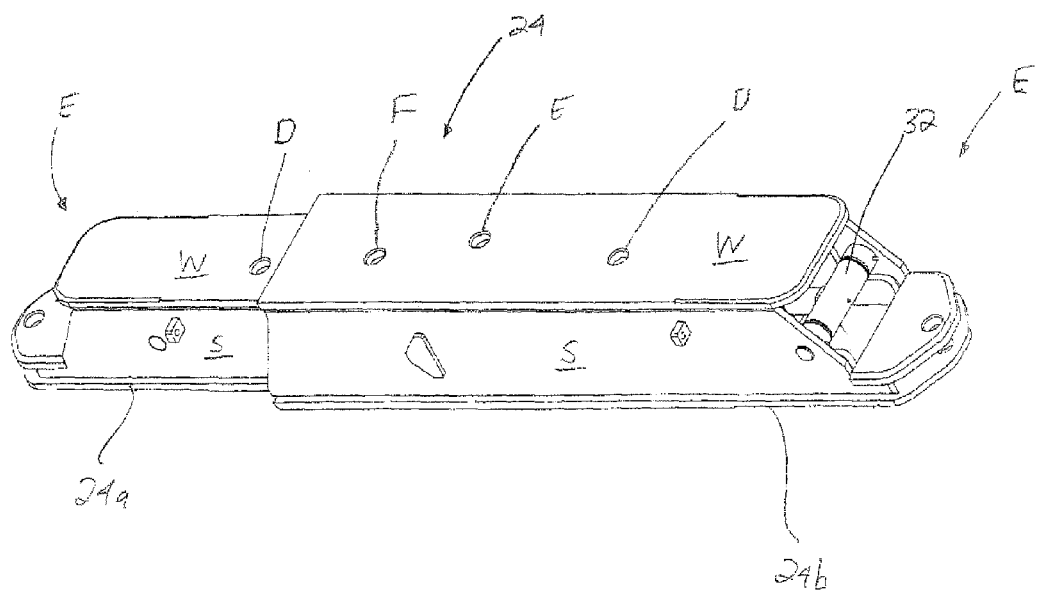
FIG. 3 is a side perspective view of an axle.
Figure 4:
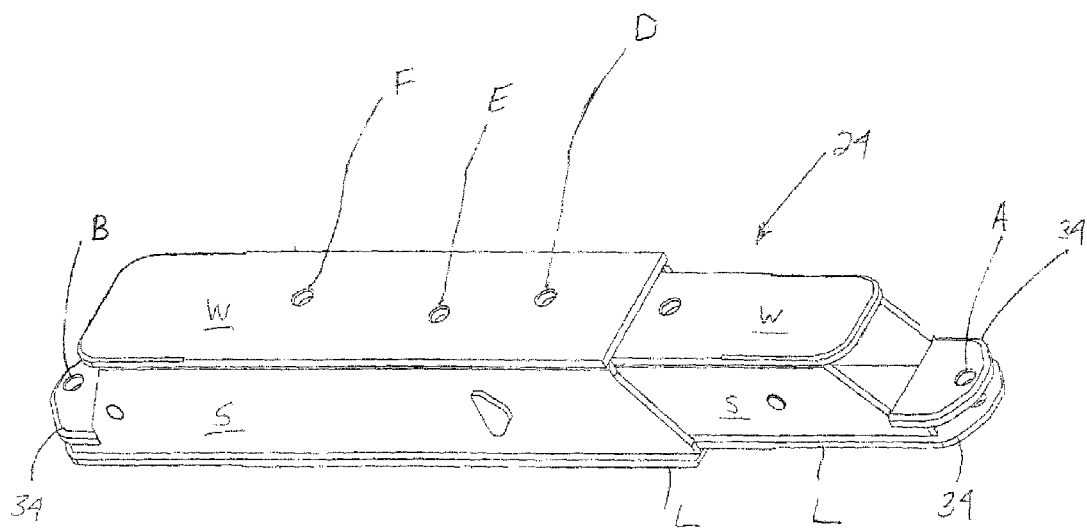
FIG. 4 is another side perspective view of the axle of FIG. 3.

With reference to FIGS. 3 and 4, one of the axles 24 is shown isolated from the crane 10. In the illustrated embodiment, the axle 24 includes two telescoping portions 24a, 24b, each having a top wall W and bottom wall L connecting with generally parallel sidewalls S. An actuator, such as a hydraulic cylinder 32, may be provided internally within these portions 24a, 24b for extending and retracting them relative to each other to move the corresponding side frame 28, 30 to the desired position (when lifted from the ground, such as using an onboard outrigger (not shown) or the like). Specifically, the rod end of the cylinder 32 may be mounted to the inner portion 24a, while the case end is mounted to the outer portion 24b, but of course this configuration could be reversed. The other axle 26 may be substantially identical, but could also be of a different construction depending on the particular arrangement.

Figure 5:
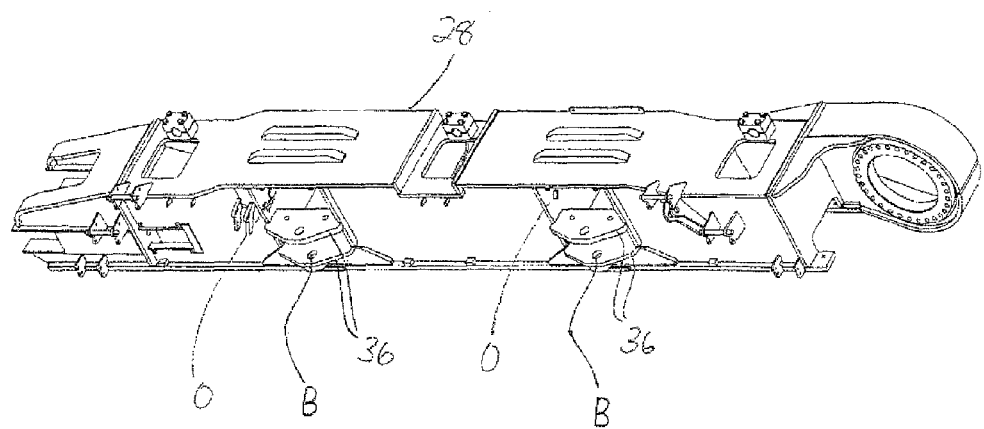
FIG. 5 is a perspective view of a frame.

As shown in FIGS. 3 and 4, the opposed ends of the axles 24, 26 may be tapered in the horizontal direction (note the differential lengths of top and bottom walls W, L in the transverse direction, as well as the angled ends of the sidewalls S). These tapered, opposed ends are thus adapted to be positioned in openings O in the side frames 28, 30, which are positioned between the upper and lower runs of the endless crawler track 22. With reference to FIG. 5, at least one, and preferably both of these ends may include a low-profile connector for forming a connection with the side frames 28, 30 so as to associate the crawler tracks 22 with the crane 10. Preferably, the connector may comprise at least one, and preferably a pair of plates 34. These plates 34 are most preferably spaced apart in the vertical direction V (FIG. 6), and have apertures A, which correspond to apertures B in a corresponding pair of spaced plates 36 carried by the frame 28, 30 adjacent to the opening O.

Figure 6:
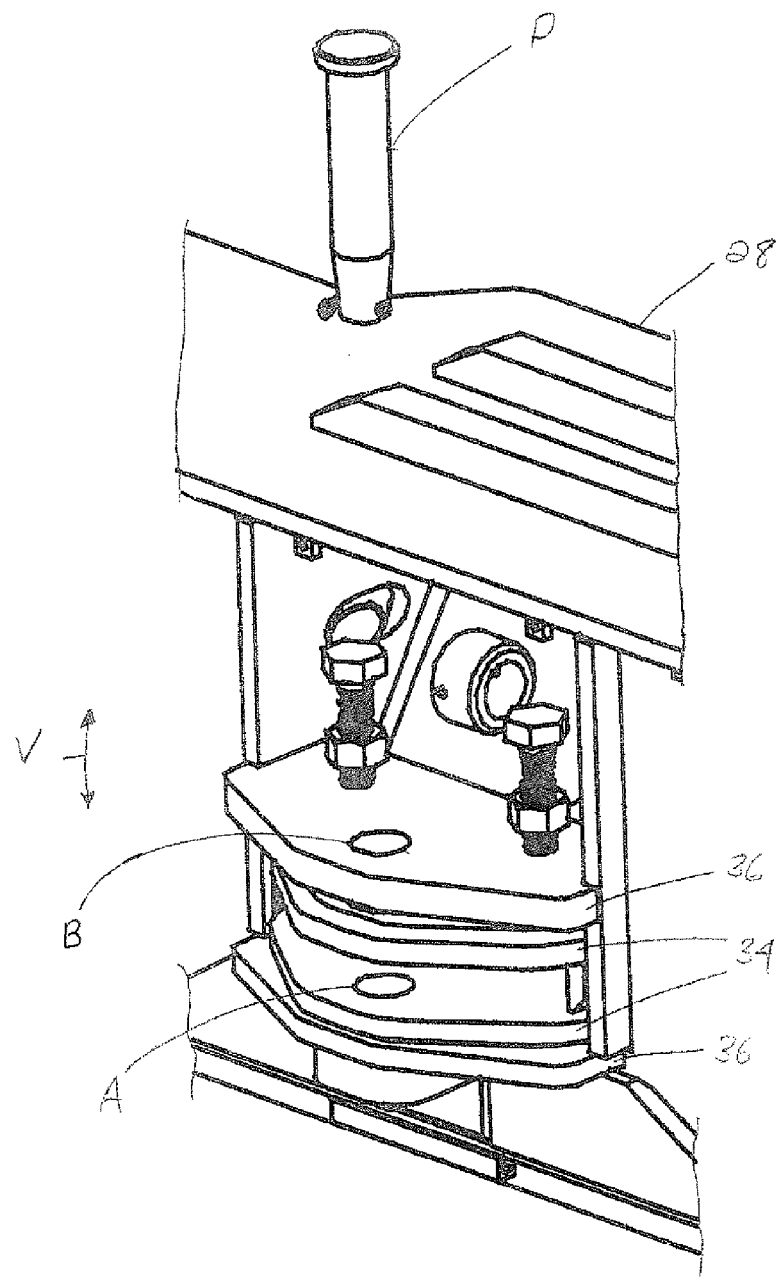
FIGS. 6 and 6a are partially cutaway perspective views of the axles connected to the side frame.
Figure 6A:
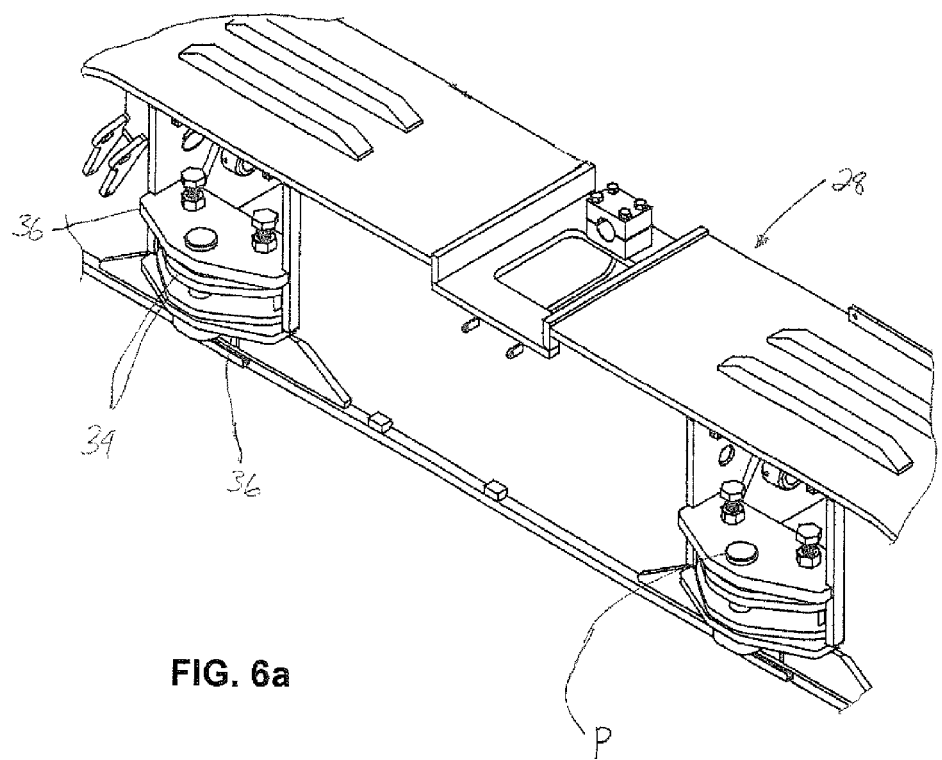
Figure 7:
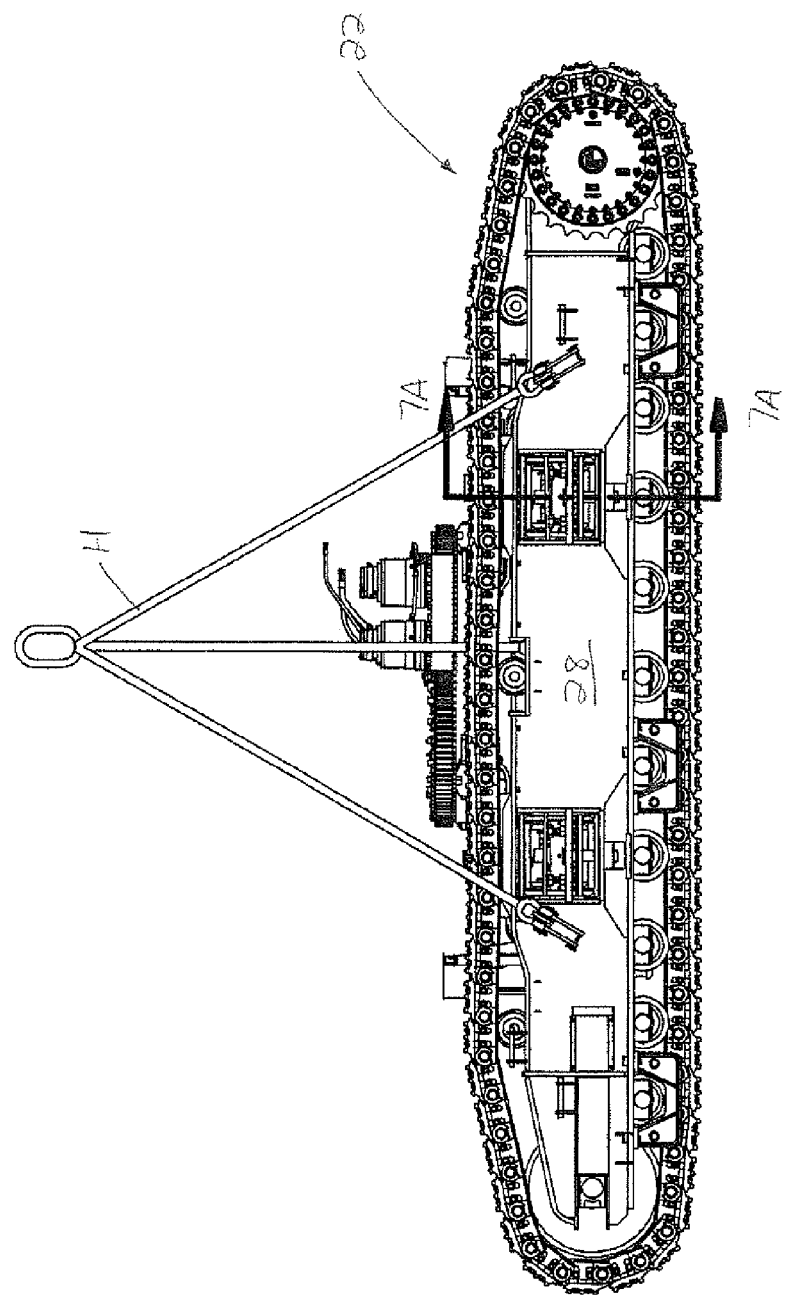
FIGS. 7 and 7a are side and cross-sectional views of the axles connected to the side frame.

Turning to FIGS. 6 and 7, when the tapered ends of the axle 24, 26 are positioned in the opening O for connection to the side frames 28, 30, the apertures A, B align. As shown in FIG. 6a, a fastener or connector in the form of a pin P having a tapered end and an oversized head may then be placed through the aligned apertures A, B to form the connection between the respective side frame 28, 30 and the corresponding, axle 24, 26. When the frame 28 or 30 needs to be disconnected from the crane 10, such as for transport, the pin may be removed from the aligned apertures A, B and the axles 24, 26 may be withdrawn from the corresponding openings O. The crawler track 22 may then be removed, such as by using an associated hoist line H.

Figure 7A:
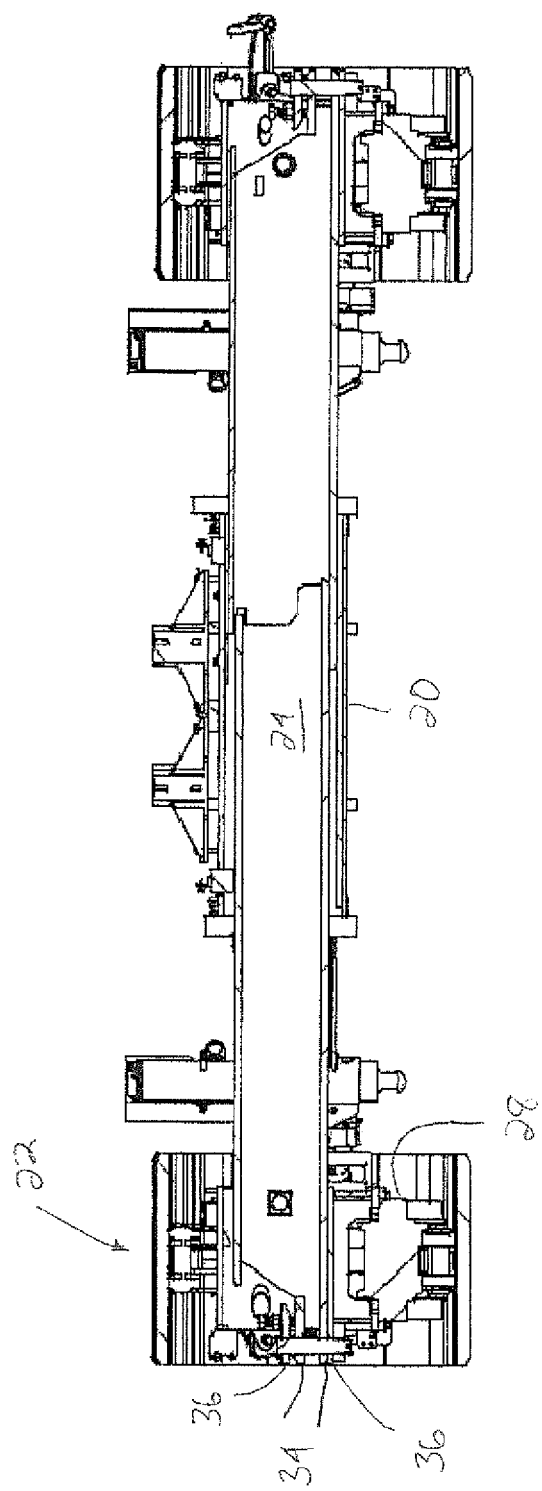

As should now be understood, the pinned connection between the tapered ends of the axles 24, 26 and side the frames 28, 30 lies outboard or outside of the frames relative to the main body 20. This manner of connection allows an operator to access the pin P for removal in an easy and efficient manner to transport the frames 28, 30 apart from the crane 10. No tools are required to remove any threaded bolts or nuts, nor is it necessary for the operator to position themselves between the inside face of the crawler track 22 and the outside face of the main body 30 (which can be a relatively small space when the axles 24, 26 are in a retracted position close to the periphery of the main body 20). As perhaps best understood by viewing FIG. 7a, the tapered end of the axle 24 also allows it to abut closely with the inboard end of the plates 36, thus defining a maximum travel position.

As noted above, the axles 24, 26 are preferably extensible relative to the body 20. This is useful for moving the crawler tracks 22 to a proper position based on a particular operating condition. To accommodate the adjustment while securely holding the axles 24, 26 in the desired position, at least one, and preferably both of the portions (24a, 24b for axle 24) includes at least two receivers, which may take the form of apertures D, E, F formed in the top walls W of the axle portions 24a, 24b. These apertures D, E, F are adapted for receiving a connector, such as a pin, to connect the respective portion to the body 20.

Preferably, at least two of the apertures D, E, or F are spaced apart in the travel direction T, and all present are spaced in the transverse direction. The transverse spacing such that two of the apertures D, E, or F do not align on the same longitudinal axis of the axle 24, 26 is designed to allow for pre-selected positions to be achieved in a particularly efficient and reliable manner. For example, a first aperture D may correspond to the extended position, whereas a second aperture F may correspond to the retracted position, and the third aperture E corresponds to a position intermediate of the extended and retracted positions.

To form the connection, and as shown in FIG. 8, the pin N may extend through one of a pair of receivers 38, 40 associated with the body 20. The receivers 38, 40 are arranged so as to allow the pin N to engage the axle 24 or 26. Preferably, one of the receivers 38 aligns along an axis in the transverse direction with two of the apertures D, F, while a second of the receivers 40 aligns with the other aperture E. However, it is within the broadest aspects of the disclosure to provide only two spaced apertures D, E, in which case the receivers 38, 40 would align accordingly along the transverse axis.

Figure 9:
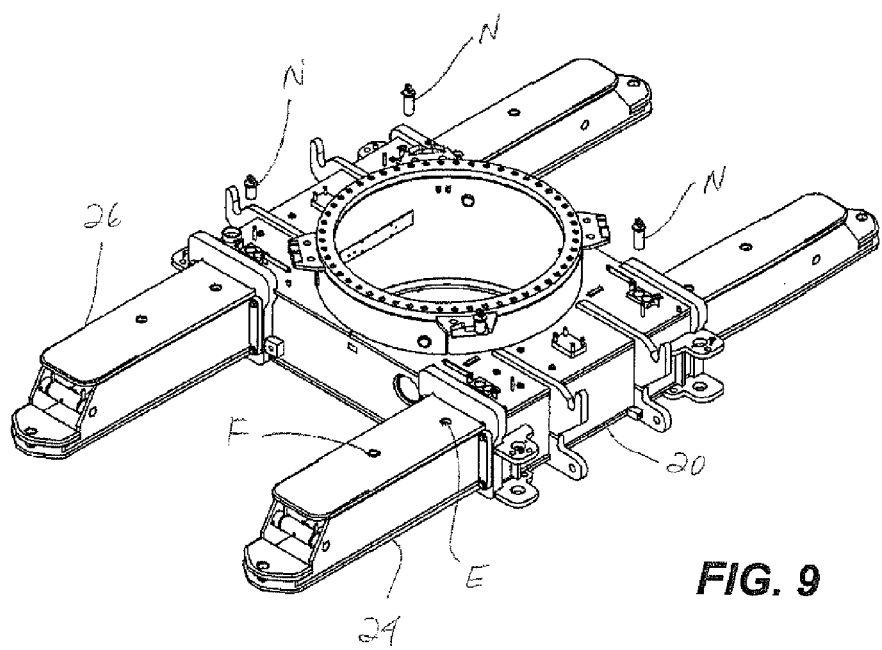
FIGS. 9-11 are perspective views of the axles in an extended, intermediate, and retracted position.
Figure 10:
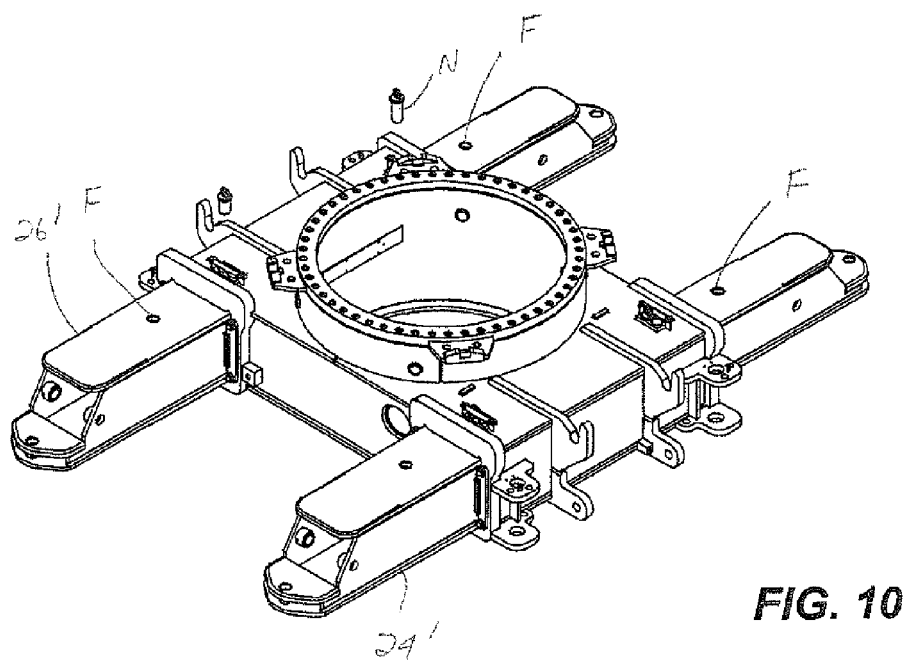
Figure 11:
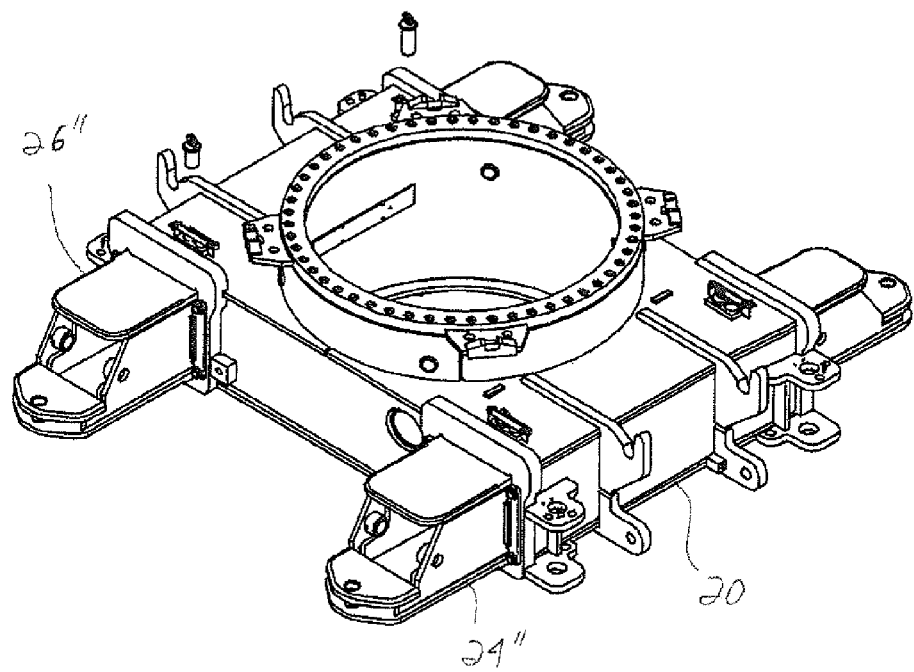

Turning to FIGS. 9-11, the various positions of the axles 24, 26 and the particular use of the pin N to achieve these positions may be understood. Specifically, positioning the pin N in the first receiver 38 associated with aperture D when the two align (closest to the main body 20 as shown in FIG. 9) corresponds to the fully extended position (24, 26). Placing the pin N through the second receiver 40 and into aligned aperture 40 (as shown in FIG. 10) corresponds to an intermediate position (24', 26'). The third aperture F (farthest from the main body as shown in FIG. 11) corresponds to the first receiver 38, and a fully retracted position (24", 26").

When the operator desires to set or change the position of the axles, the pin N may be placed in the desired receiver 38, 40 corresponding to the desired position of the axle 24, 26 (extended, intermediate or retracted). The hydraulic cylinder 32 may then extend or retract the axle 24, 26 to the desired position. When the position is reached such that the receiver 38, 40 aligns with the corresponding aperture D, E, or F, the pin N then falls into place to lock the axle 24, 26 to the main body 20 in the selected position, which is thus pre-determined.

As should now be appreciated, an advantage of this arrangement is that once the operator places the pin N in the desired receiver 38, 40, no other manual intervention is required to form the desired locking condition. The actuator, such as hydraulic cylinder, extends or retracts the axle 24, 26 to the selected position, at which point the pin N will automatically fall into place into the corresponding aperture in the axle 24 or 26. As a result, the operator may simply move the pin N from one receiver (e.g., 38) to the other receiver (e.g., 40) in order to change the position of the end of the axle 24 or 26 with respect to the main body 20. This requires less operator intervention and does not require pre-alignment before the pin is inserted, which creates a more time-efficient and effective operation for erecting or dismantling the crane (which may be done as part of a "self-assembly" operation; see FIG. 12).

Although the above-description pertains to locking a single axle or portion of the axle to the main body 20, it should be appreciated that the other axles/axle portions may be automatically locked to the main body in the same manner. For example, in the embodiment illustrated in FIG. 2, the axles 24, 26 are removably connected to the main body 20 at four different locations. Specifically, both portions 24a, 24b of the first axle 24 are connected to the main body and both portions of the second axle 26 are connected to the main body 20 in the same manner. However, it should further be appreciated that the locking arrangement could be provided at only one of the four connection points as well.

The foregoing descriptions of various embodiments of the axle arrangement for a vehicle provide illustration of the inventive concepts. The descriptions are not intended to be exhaustive or to limit the disclosed invention to the precise form disclosed. Modifications or variations are also possible in light of the above teachings. The embodiments described above were chosen to provide the best application to thereby enable one of ordinary skill in the art to utilize the inventions in various embodiments and with various modifications as are suited to the particular use contemplated. All such modifications and variations are within the scope of the invention as determined by the appended claims when interpreted in accordance with the breadth to which they are fairly, legally and equitably entitled.

The invention claimed is:

1. An apparatus for a mobile crane supported by ground-engaging motive devices for moving the crane in a travel direction, comprising:
   an axle elongated in a direction transverse to the travel direction and adapted to be connected to the crane, the axle having a first end and including a first aperture; and a first frame for supporting one of the ground-engaging motive devices, the frame including a first opening which the first end of the axle passes through to adjacent an external side of the frame, said frame including a second aperture for aligning and registering with the first aperture in a vertical direction so as to be capable of receiving a connector in the vertical direction for connecting the first end of the axle to the frame;

wherein the first end is tapered and includes an upper portion having the first aperture, such that the first aperture is outside of the first opening.

2. The apparatus according to claim 1, wherein the axle includes a second tapered end, and further including a second frame for supporting another of the ground engaging motive devices, the second frame including a second opening for receiving the second tapered end of the second portion of the axle.

3. The apparatus according to claim 2, wherein the axle comprises a first portion telescopingly received in a second portion, the first portion including the first end, and further including an actuator for moving the first portion relative to the second portion.

4. The apparatus according to claim 1, wherein the axle includes first and second receivers, and further including a third receiver associated with a main body of the crane and adapted for receiving a connector for engaging one of the first and second receivers.

5. The apparatus according to claim 4, wherein the first and second receivers comprise spaced apertures formed in a top wall of the axle.

6. The apparatus according to claim 4, wherein the first and second receivers comprise longitudinally spaced apertures formed in a top wall of the axle.

7. The apparatus according to claim 4, wherein the third receiver includes a first hole for aligning with the first receiver and a second hole for aligning with the second receiver.

8. The apparatus according to claim 1, wherein the first end of the axle includes a pair of vertically spaced plates, an upper one of said plates including the first aperture.

9. The apparatus according to claim 1, wherein the frame includes a pair of spaced plates for receiving the tapered end of the axle, one of said plates including the second aperture and positioned within the first opening.

10. A mobile crane, comprising:
a main body carrying a bearing;
a superstructure supported by the bearing;
a boom carried by the superstructure; and
the apparatus according to claim 1.

11. An apparatus for a mobile crane supported by ground-engaging motive devices for moving the crane in a travel direction, comprising:
an axle elongated in a direction transverse to the travel direction and adapted to be connected to the crane, the axle having a first end and including a first aperture; and
a first frame for supporting one of the ground-engaging motive devices, the frame including a first opening which the first end of the axle passes through to adjacent an external side of the frame, said frame including a second aperture for aligning and registering with the first aperture in a vertical direction so as to be capable of receiving a connector in the vertical direction for connecting the first end of the axle to the frame;
wherein the first end is tapered and includes an upper portion having the first aperture, such that the first aperture is outside of the first opening;
wherein the axle includes a second tapered end.

12. The apparatus according to claim 11, further including a second frame for supporting another of the ground engaging motive devices, the second frame including a second opening for receiving the second tapered end of the second portion of the axle.

13. The apparatus according to claim 11, wherein the axle comprises a first portion telescopingly received in a second portion, the first portion including the first end, and further including an actuator for moving the first portion relative to the second portion.

14. The apparatus according to claim 11, wherein the axle includes first and second receivers, and further including a third receiver associated with a main body of the crane and adapted for receiving a connector for engaging one of the first and second receivers.

15. The apparatus according to claim 14, wherein the first and second receivers comprise spaced apertures formed in a top wall of the axle.

16. The apparatus according to claim 14, wherein the first and second receivers comprise longitudinally spaced apertures formed in a top wall of the axle.

17. The apparatus according to claim 14, wherein the third receiver includes a first hole for aligning with the first receiver and a second hole for aligning with the second receiver.

18. The apparatus according to claim 11, wherein the first end of the axle includes a pair of vertically spaced plates, an upper one of said plates including the first aperture.

19. The apparatus according to claim 11, wherein the frame includes a pair of spaced plates for receiving the tapered end of the axle, one of said plates including the second aperture and positioned within the first opening.

20. An apparatus for a mobile crane supported by ground-engaging motive devices for moving the crane in a travel direction, comprising:
an axle elongated in a direction transverse to the travel direction and adapted to be connected to the crane, the axle having a first end and including a first aperture; and
a first frame for supporting one of the ground-engaging motive devices, the frame including a first opening which the first end of the axle passes through to adjacent an external side of the frame, said frame including a second aperture for aligning and registering with the first aperture in a vertical direction so as to be capable of receiving a connector in the vertical direction for connecting the first end of the axle to the frame;
wherein the first end is tapered and includes an upper portion having the first aperture, such that the first aperture is outside of the first opening;
wherein the axle comprises a first portion telescopingly received in a second portion, the first portion including the first end, and further including an actuator for moving the first portion relative to the second portion.

* * * * *